(12) United States Patent
Chen et al.

(10) Patent No.: US 7,708,952 B2
(45) Date of Patent: May 4, 2010

(54) DEVICE FOR REACTION OR SEPARATION AND A CONTINUOUS ESTERIFICATION PROCESS USING THE DEVICE

(75) Inventors: Zhenxin Chen, Beijing (CN); Mingkang Yu, Shanghai (CN); Shaopeng Wang, Beijing (CN)

(73) Assignees: China Petroleum & Chemical Corporation, Beijing (CN); Sinopec Shanghai Petrochemical Corporation Limited, Shanghai (CN); China Textile Academy, Beijing (CN)

( * ) Notice: Subject to any disclaimer, the term of this patent is extended or adjusted under 35 U.S.C. 154(b) by 795 days.

(21) Appl. No.: 10/556,042
(22) PCT Filed: Jan. 2, 2004
(86) PCT No.: PCT/CN2004/000006
§ 371 (c)(1),
(2), (4) Date: Nov. 27, 2006
(87) PCT Pub. No.: WO2004/098760
PCT Pub. Date: Nov. 18, 2004

(65) Prior Publication Data
US 2007/0100126 A1  May 3, 2007

(30) Foreign Application Priority Data
May 8, 2003 (CN) ............... 03 1 16811

(51) Int. Cl.
*B01J 10/00* (2006.01)
*B01F 5/10* (2006.01)
*C07C 69/82* (2006.01)
*C07C 67/08* (2006.01)
*C07B 41/12* (2006.01)

(52) U.S. Cl. ............ 422/129; 422/139; 422/140; 422/145; 422/146

(58) Field of Classification Search .......... 422/129, 422/139, 140, 145, 146
See application file for complete search history.

(56) References Cited

U.S. PATENT DOCUMENTS 3,884,854 A * 5/1975 Ventura et al. ............... 528/285
3,905,929 A * 9/1975 Noll, Klaus ................. 524/839
2002/0087028 A1* 7/2002 Hirata et al. ................. 560/224

FOREIGN PATENT DOCUMENTS

| CN | 2254447 Y | 5/1997 |
| CN | 1255487 A | 6/2000 |
| JP | 10-87805 | 4/1998 |
| JP | 11-116536 | 4/1999 |
| SU | 360976 A * | 11/1970 |

OTHER PUBLICATIONS

Translation of SU360976A—May 19, 2009.*
Machine translation of JP-11116536A—May 20, 2009.*

* cited by examiner

Primary Examiner—Walter D Griffin
Assistant Examiner—Huy-Tram Nguyen
(74) Attorney, Agent, or Firm—Dickstein Shapiro LLP

(57) ABSTRACT

The present invention relates to a reaction or separation device, wherein the materials circularly flow in a container and a pipe. Said device contains a container and an external circular pipe, wherein the container is a double-chamber structure. The inner chamber consists of an outer cylinder and an inner cylinder with the latter being jacketed by the former, and there is a space between the walls of the outer cylinder and the inner cylinder. The lower end of the outer cylinder is open and higher than the bottom of the container, and the outer cylinder is fixed to the wall or bottom of the container. The upper end of the inner cylinder is open and its lower end connects with the external circular pipe through the feed outlet. A continuous passage is sequentially formed from the spaces between the wall of the outer cylinder and that of the container, between the lower end of the outer cylinder and the bottom of the container, between the wall of the outer cylinder and that of the inner cylinder, and in the inner cylinder. The external circular pipe connects with the bottom of the container and leads to the inner chamber, and connects with the sidewall at the lower part of the container and leads to the outer chamber, respectively. The present invention also relates to a continuous esterification process, which comprises feeding liquid reaction materials to the reaction device and carrying out reaction under reaction conditions.

16 Claims, 2 Drawing Sheets

US 7,708,952 B2

DEVICE FOR REACTION OR SEPARATION AND A CONTINUOUS ESTERIFICATION PROCESS USING THE DEVICE

CROSS REFERENCE TO RELATED APPLICATION

This application is a National Stage filing under 35 U.S.C. § 371 of International Application No. PCT/CN2004/000006, filed on Jan. 2, 2004, which designated the United States and which was in the Chinese language, and claims priority benefit from Chinese Patent Application No. 03116811.6, filed on May 8, 2003.

TECHNICAL FIELD

The present invention relates to a device for reaction or separation. In particular, it relates to a reaction or separation device wherein the materials circularly flow in a container and a pipe, and the use of said device as a continuous esterification device. The present invention also relates to a continuous esterification process using said device, which comprises feeding liquid reaction materials to said device and carrying out reaction under the esterification conditions.

BACKGROUND ARTS

In chemical production, there exist a large number of container devices for reaction or separation that use external circular heating, such as devices for producing polyesters, wherein the container may be a kettle or a tower. The raw materials to be heated generally enter an external heat exchanger from the bottom of the container through a pipe for heating, and then return to the container from the wall at the lower part of the container through the pipe. There exists a density difference of the materials before and after heating, which creates a driving force for the materials from the bottom of the container to automatically return to the container through the heat exchanger, said driving force being known as thermal siphon.

Polyesters mainly comprise poly diethyl p-phthalate, poly dibutyl p-phthalate, and dipropyl p-phthalate. Presently, their preparation processes are mostly direct esterification, i.e. carrying out esterification from phthalic acid and the corresponding diol directly. The existing processes for producing esters are mostly continuous ones. There are many technological routes, but they are basically composed of three continuous procedures, i.e. esterification, prepolycondensation, and polycondensation, wherein esterification is at the forefront and therefore is the most vital part of the whole technological route. It will exert significant effect on the operability of the subsequent procedures and the quality of the final product. The esterification device must meet the requirements of a heavy heat duty, uniform heating of the materials, instant removal of excessive diol and water generated in esterification to facilitate further reaction, and a flow of the materials in the system near the plug flow as much as possible to make the residence time of various parts of the materials distribute uniformly. The importance of the esterification reaction and its high requirements for the esterification device make the study of the esterification device become the most attractive part in the study of the polyester process.

In the prior art, the earlier esterification device was the continuous stir reactor, which uses a jacket or internal tube heat exchanger for heating and exerts violent stirring. In addition, series multiple kettles are used to improve the distribution of the residence time of the materials. The drawbacks of the continuous stir reactor are evident, i.e., the occurrence of the temperature field and concentration field of the internal materials caused by the amplification of the device, which affect the uniformity of the materials, a high investment resulted from large numbers of the devices and powerful stirring equipments, and a considerable operation cost of the stirring equipments. Latter developed externally circular heating esterification device made a great progress, such as the device introduced in JP Tokkai-Hei 10-87805 and JP Tokkai-Hei 11-116536. Such an externally circular heating esterification device mainly comprises an external tube heater and a reaction kettle. A solid/liquid two-phase mixed slurry of phthalic acid and diol is first injected into the circulating oligomer, then fed into a tube heater to complete heating and carry out primary esterification reaction, and finally fed into the reaction kettle for further esterification. The product is discharged from the bottom of the kettle, a part of which returns to the heater for circulation. Various baffle components are equipped in the reaction kettle, so that the stream in the kettle approaches the plug flow as much as possible. The merits of the externally circular heating esterification device are to better meet the need for powerful heat duty, to use no stirring equipment, and to make the residence time distribution of various parts of the materials more uniform.

However, such a prior externally circular heating esterification device has an evident drawback. The driving force for the stream only comes from the thermal siphon, but the flow rate is generally difficult to meet the requirement of the process only using the driving force generated by thermal siphon for the materials to automatically circularly flow. Installation of pumps in the pipe between the bottom of the container and the heat exchanger is a commonly used remedial method, but the use of pumps in chemical devices will not only increase the energy consumption, but also increase the routine maintenance cost. Another scheme for overcoming the drawback is to increase the loading of the diol in the reaction materials, the large amount of excessive diol serving as a carrier for the flow of the reactants. Taking the preparation of bis-hydroxy-ethyl p-phthalate (BHET) from p-phthalic acid (PTA) and ethylene glycol (EG) as an example, the molar ratio of feeds EG to PTA is generally 2.0-2.2:1, and the excessive diol increases unnecessary energy consumption from evaporation to recovery by condensation.

CONTENTS OF THE INVENTION

The objective of the present invention is to solve the technical problems of the too small driving force and the thus caused insufficient flow rate resulted from using thermal siphon only and the too high molar ratio of the fed diol to p-phthalic acid.

The present invention therefore provides a new device for reaction or separation, which is used in case of the presence of escaping vapor due to evaporation or reaction. The driving force for the circular flow of the materials is enhanced between the container and the external heat exchanger by installing still structural components in the container and thereby the drawbacks of the too small driving force and the thus caused insufficient flow rate resulted from using thermal siphon only, and the too high molar ratio of the fed diol to p-phthalic acid are overcome.

The present invention provides a reaction or separation device wherein the materials circularly flow in a container and a pipe. Said device comprises container (1) and externally circulating pipe (2), wherein the container is a double-chamber structure. An inner chamber is installed inside the container and the continuous space in the container and outside the inner chamber forms the outer chamber. The top of the inner chamber locates in the continuous space under the top of the container. The inner chamber consists of an outer cylinder and an inner cylinder with the latter being jacketed by the former, and there exists a space between the walls of the outer cylinder and the inner cylinder. The lower end of the outer cylinder is open and a connecting passage with a throttling controller is equipped between its upper end and the upper part of the external chamber to regulate the pressure difference between the inner and outer chambers. The outer cylinder is fixed to the wall or bottom of the container and its lower end is higher than the bottom of the container. The upper end of the inner cylinder is open and its lower end connects with the external circular pipe through the feed outlet. The inner cylinder is fixed to the bottom of the container and its upper end is higher than the lower end of the outer cylinder and lower than the top cover of the outer cylinder. A continuous passage is sequentially formed from the spaces between the wall of the outer cylinder and that of the container, between the lower end of the outer cylinder and the bottom of the container, between the wall of the outer cylinder and that of the inner cylinder, and in the inner cylinder. The external circular pipe connects with the bottom of the container and leads to the inner chamber, and connects with the sidewall of the lower part of the container and leads to the outer chamber, respectively.

In a preferred embodiment, the top of the inner chamber of said reaction or separation device locates below ½ of the height of the container interior, and preferably between ⅕ and ½.

In another preferred embodiment, a continuous ring-shape passage with a section of upright and reverse U-shape is sequentially formed from the spaces between the wall of the outer cylinder and that of the container, between the lower end of the outer cylinder and the bottom of the container, between the wall of the outer cylinder and that of the inner cylinder, and in the inner cylinder of said reaction or reaction device.

In another preferred embodiment, a heat exchanger may be installed in the external circular pipe to conduct energy exchange.

Preferably, the aforesaid inner chamber may consist of an outer cylinder and an inner cylinder with the latter being jacketed concentrically with the former. There exists a space between the wall of the outer cylinder and that of the inner cylinder to form a passage. The lower end of the outer cylinder is open and a connecting passage with throttling controller is equipped between its upper end and the upper part of the external chamber to regulate the pressure difference between the inner and outer chambers. The outer cylinder is fixed to the wall or the bottom of the container with a supporter and its lower end is higher than the bottom of the container. The upper end of the inner cylinder is open and the lower end connects with the external circular pipe through the feed outlet and fixed to the bottom of the container. The upper end of the inner cylinder is higher than the lower end of the outer cylinder but lower than the top cover of the outer cylinder. A continuous ring-shape passage with a section of upright and reverse U-shape is sequentially formed from the spaces between the wall of the outer cylinder and that of the container, between the lower end of the outer cylinder and the bottom of the container, between the wall of the outer cylinder and that of the inner cylinder, and in the inner cylinder. This ring-shape passage is a U-shape pipe connecting the inner chamber and outer chamber. In a preferred embodiment, the ratio of the diameter of the inner cylinder to that of the container is 1:1.8-2.5.

In the device of the present invention, said container is a container preferably selected from the packed tower, tray tower, and reaction kettle.

The present invention also relates to the application of the aforesaid reaction or separation device as a continuous esterification reaction device, wherein the esterification reaction is the one between phthalic acid and diol.

The present invention also provides a continuous esterification process, which comprises feeding the liquid reaction materials to the aforesaid device and carrying out reaction under the esterification conditions. Said device comprises a container and an externally circular pipe, wherein the container is a double-chamber structure. An inner chamber is installed inside the container and the continuous space of the container outside the inner chamber forms the outer chamber. The top of the inner chamber locates in the continuous space under the top of the container. The inner chamber consists of an outer cylinder and an inner cylinder with the latter being jacketed by the former and there exists a space between the walls of the outer cylinder and the inner cylinder. The lower end of the outer cylinder is open and a connecting passage with throttling controller is equipped between its upper end and the upper part of the external chamber to regulate the pressure difference between the inner and outer chambers. The outer cylinder is fixed to the wall or bottom of the container and its lower end is higher than the bottom of the container. The upper end of the inner cylinder is open and its lower end contiects with the external circular pipe through the feed outlet. The inner cylinder is fixed to the bottom of the container with its upper end higher than the lower end but lower than the top cover of the outer cylinder. A continuous passage is sequentially formed from the spaces between the wall of the outer cylinder and that of the container, between the lower end of the outer cylinder and the bottom of the container, between the wall of the outer cylinder and that of the inner cylinder, and in the inner cylinder. The external circular pipe connects with the bottom of the container and leads to the inner chamber, and connects with the sidewall of the lower part of the container and leads to the outer chamber, respectively. When circularly flowing in the device, the liquid reaction materials form a liquid seal in the continuous passage, which isolates the vapor-phase space of the inner chamber from that of the outer chamber. A driving force is generated by adjusting the volume of the inner chamber space to form sufficient pressure difference between the inner chamber and the outer chamber.

In the process of the present invention, the liquid reaction materials are preferably phthalic acid and diol, wherein said phthalic acid is selected from p-phthalic acid, m-phthalic acid, and o-phthalic acid, and said diol is selected from ethylene glycol, propylene glycol, and butylene glycol. In a preferred embodiment, the molar ratio of diol to phthalic acid in the feed is 1.5-1.9:1, the preferred reaction temperature is 258-290° C., and the reaction pressure is 40-120 kPa.

Not to be limited by any theory, the inventor considers that in the device of the present invention, the container is a double-chamber structure and the inner chamber and the outer chamber connect with a U-shape pipe, which serves as a passage of the liquid materials. Therefore, the materials present in the U-shape pipe form a liquid seal while working, which, in combination with the throttling function of the throttling controller in the connecting pipe, lays the inner chamber and outer chamber in a relative isolation state. In general, the pressure of the space above the liquid level of the outer chamber or inner chamber mainly depends on the volume of the space and the amount of the vapor materials escaped due to evaporation or reaction, wherein the pressure is inversely proportional to the volume of the space, and directly proportional to the amount of the escaped vapor materials. When the factors in the device such as the materials, temperature, reaction nature, etc. are determined, the amount of the escaped vapor is knowable. As said previously, the top of the inner chamber may locate below ½ of the height of the continuous space from the bottom of the container upwards, and the lower the top of the inner chamber, the bigger the space of the outer chamber above the liquid level than the space of the inner chamber above the liquid level. Therefore, no matter whether the amount of the escaped vapor in the outer chamber is equal to, greater than or smaller than that in the inner chamber, it is possible to make the pressure of the inner chamber space higher than that of the outer chamber space and generate enough pressure difference, as long as the designed height of the top of the inner chamber and the designed area of the projection of the inner chamber are adjusted to make the space of the outer chamber above the liquid level enough bigger than the space of the inner chamber above the liquid level. Since the connection orifices of the inlet and outlet of the container with the external heat exchanger locate in the inner chamber and outer chamber, respectively, this pressure difference becomes another driving force for the circular flow of the materials between the container and the external heat exchanger, and thereby increases the rate of the circular flow of the materials.

The connecting pipe connects the space of the outer chamber above the liquid level and the space of the inner chamber above the liquid level, and the difference between the pressures of the inner chamber and the outer chamber may be adjusted to a proper value by adjusting the throttling controller in the connecting pipe.

Compared to the prior art, the present invention only adds still components in the container and thereby uses the pressure generated by the escape of the vapor due to evaporation or reaction as another driving force to drive the circular flow of the materials and thus overcome the drawback of a too small driving force, which is difficult to meet the requirement of the process, generated only by the thermal siphon for the automatic flow of the materials, and the drawback of too high a molar ratio of the fed diol to p-phthalic acid.

EMBODIMENTS

In combination with the figures, the present invention will be further described below with particular embodiments. It should be understood that the scope of the present invention is not limited to the characters described by the particular embodiments.

Figure 1:
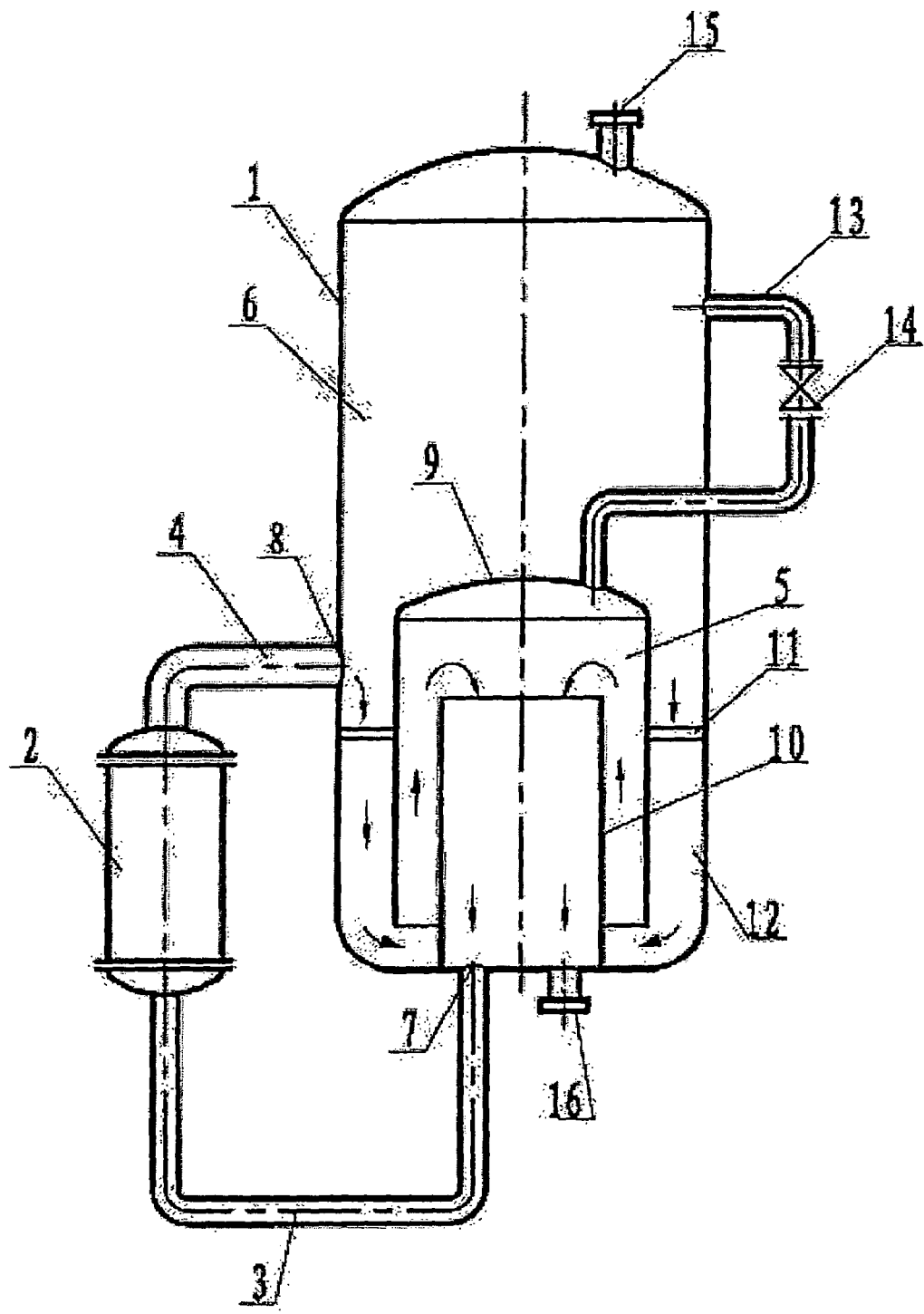
FIG. 1 shows an embodiment of the present invention wherein the present invention is used in a batch reaction kettle and the figure is the schematic diagram of the sectional structure of the device.

In can be seen from the embodiment shown in FIG. 1, the device comprises container 1, i.e. a reaction kettle, and external heat exchanger 2, and the inlet and outlet of the heat exchanger connect with the reaction kettle through pipes 3 and 4, respectively. The reaction kettle is a double-chamber structure having an inner chamber and an outer chamber. Inner chamber 5 locates at the bottom of the kettle and the continuous space of the kettle outside the inner chamber is outer chamber 6. The top of the inner chamber locates near ½ of the height of the kettle interior. Pipe connection orifice 7 connecting the reaction kettle with the inlet of the heat exchanger locates at the bottom of the inner chamber, and leads to the inner chamber, and the pipe connection orifice 8 connecting the reaction kettle with the outlet of the heat exchanger locates on the sidewall at the lower part of the kettle and leads to the outer chamber.

The inner chamber consists of an outer cylinder 9 and an inner cylinder 10 with the latter being jacketed concentrically with the former, and there exists a space between the walls of the outer cylinder and the inner cylinder to form a passage. The lower end of the outer cylinder is open and the upper end is sealed with a cover. The outer cylinder is fixed to the wall of the reaction kettle with supporter 11 in such a way that its lower end is higher than the bottom of the kettle. The upper end of the inner cylinder is open and the lower end is sealed and fixed to the bottom of the kettle. The upper end of the inner cylinder is higher than the lower end of the outer cylinder but lower than the sealing cover of the outer cylinder. A ring-shape passage 12 with a U-shape section is sequentially formed from the spaces between the wall of the outer cylinder and that of the reaction kettle, between the lower end of the outer cylinder and the bottom of the reaction kettle, between the wall of the outer cylinder and that of the inner cylinder. The inner chamber and the outer chamber connect with each other through the ring-shape passage.

There is a connection pipe 13 between the top of the inner chamber and the upper part of the outer chamber, and connection pipe 13 has a throttling controller 14. 15 is the feed inlet of the reaction kettle and 16 is the feed outlet of the reaction kettle.

Figure 2:
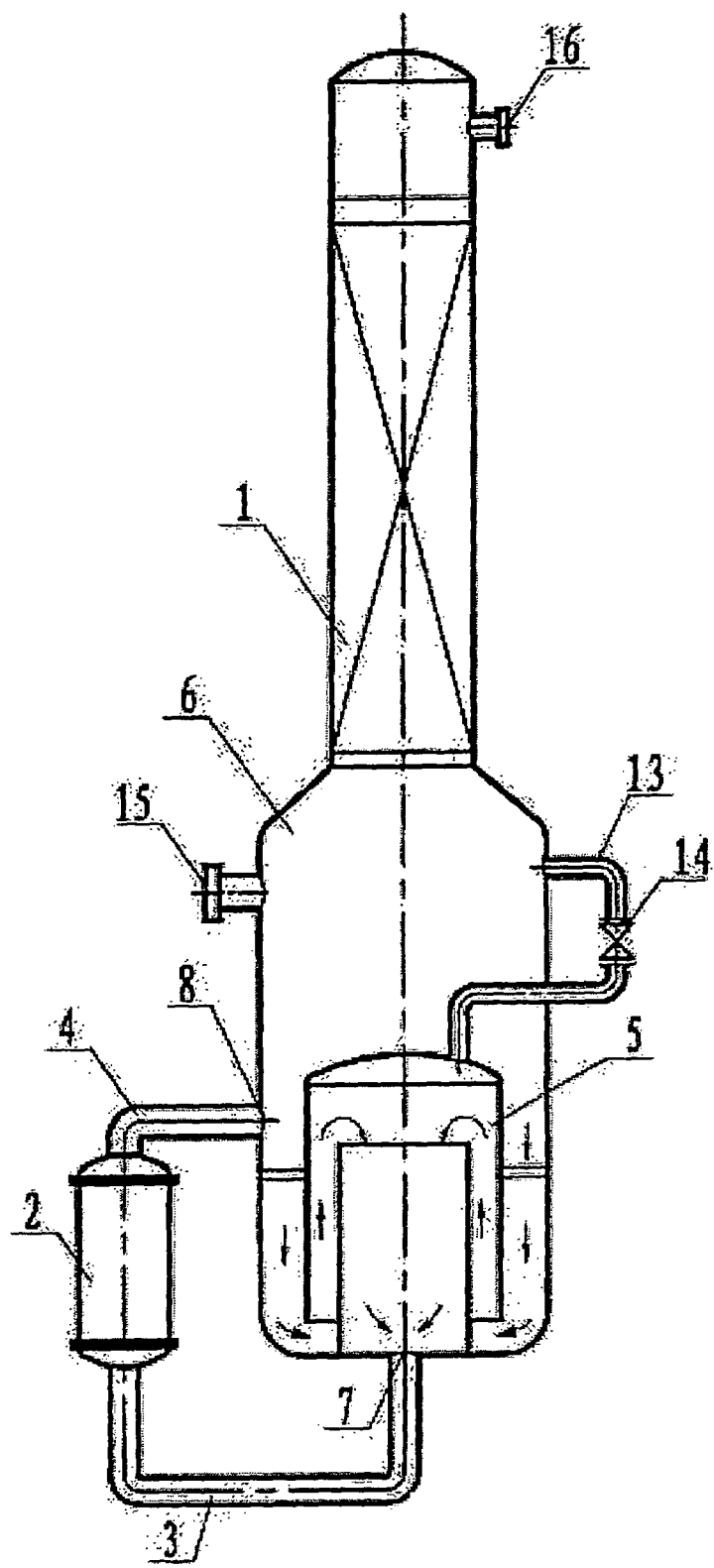
FIG. 2 shows an embodiment of the present invention wherein the present invention is used in a packed separation tower and the figure is the schematic diagram of the sectional structure of the device.

It can be seen from the embodiment shown in FIG. 2, the device comprises a container 1, i.e. a packed tower and an external heat exchanger 2, and the inlet and outlet of the heat exchanger connect with the packed tower through pipes 3 and 4, respectively. The part of the packed tower below the packing is a double-chamber structure having an inner chamber and an outer chamber. Inner chamber 5 locates at the bottom of the tower and the continuous space of the packed tower below the packing and outside the inner chamber is outer chamber 6. The top of the inner chamber locates at near ½ of the distance from the bottom of the tower to the bottom of the packing. Pipe connection orifice 7 connecting the packed tower with the inlet of the heat exchanger locates at the bottom of the inner chamber and leads to the inner chamber. Pipe connection orifice 8 connecting the packed tower with the outlet of the heat exchanger locates on the sidewall at the lower part of the tower and leads to the outer chamber.

The structure of the inner chamber in this embodiment is the same as that shown in FIG. 1. There is a connection pipe 13 between the top of the inner chamber and the upper part of the outer chamber and connection pipe 13 has a throttling controller 14. 15 is the feed inlet of the packed tower and 16 is the feed outlet of the packed tower.

EXAMPLE

The esterification reactor was composed of an esterification heater heated with a hot vapor medium and a reaction kettle connecting in series with a U-shape pipe, wherein the heater was a tube heat exchanger and the reaction kettle was a jacketed cylinder structure. A slurry feed consisting of PTA and EG entered the system through a feed nozzle, mixed with the liquid circular materials from the inner chamber of the reaction kettle, and then entered the external circular shell and tube heat exchanger for heating. The molar ratio of EG to PTA was controlled at 1.8:1. The materials were heated to 282° C. by passing through the heater and converted to water and other by-products (e.g. diglycol, etc). In the reaction kettle, there was enough vapor space above the liquid level to prevent the entrainment. The vapor-liquid mixture sprayed from the heater was subjected to flash separation to remove water and the vapor of ethylene glycol, and entered the separation tower through the vapor pipe for separation.

The reaction temperature for esterification was set at 282° C., the reaction pressure was 160 kPa (A), the total residence time of the materials in the reactor was about 90 min, the esterification rate at the outlet was about 86.9%, and the polymerization degree of the oligomer was 6-12. The oligomer with a polymerization degree of 6-12 flew out from the esterification reactor and entered the prepolycondensation heater at the lower part of the prepolycondensation tower.

The separation tower had 12 guiding sieve trays and the top temperature was 111-116° C. The evaporated low-boiling substances and water entered the top condenser from the top of the separation tower through the vapor pipe and the condensed water was collected in the water reflux tank. A part of the condensed water returned to the first tray through the water reflux pump to control the temperature of the top and the other wastewater overflowed to the wastewater treatment system of the plant. The EG flowing out from the bottom was injected into the modulation tank of the PTA feed slurry through the liquid level regulating valve.

The PTA feed slurry entering the esterification heater consisted of PTA and EG, wherein the fine p-phthalic acid (PTA) used was purchased from Xiamen Xianglu Chemicals Co., Ltd, and ethylene glycol (EG) was purchased from Beijing Yanshan Petroleum Chemicals Co., Ltd.

The process parameters for esterification reaction are shown in Table 1.

TABLE 1

Process parameters for esterification reaction

| Item | Unit | Index |
| --- | --- | --- |
| Inlet temperature of esterification heater | ° C. | 265 |
| Outlet temperature of esterification heater | ° C. | 282 |
| Temperature of inner chamber of reaction kettle | ° C. | 282 |
| Pressure of reaction kettle | kPa (G) | 60 |
| Liquid level of reaction kettle | mm | 950 |
| Temperature of the first tray of separation tower | ° C. | 114 |
| Top pressure of separation tower | kPa (G) | 45.0 |
| Inlet temperature of thermal medium of esterification heater | ° C. | 305 |
| Inlet pressure of thermal medium of esterification heater | kPa (G) | 198 |
| Outlet temperature of thermal medium of esterification heater | ° C. | 285 |

Determined by potentiometric titration, the content of the terminal carboxyl in the obtained polyethylene p-phthalate ≦25 mol/t.

Compared to the prior art, the present invention uses the double-chamber double-pressure externally circular reactor without mechanic stirrer and circular pump in the continuous esterification reaction device and therefore gains favorable effects, which particularly are:

1. The quality of the product is higher: compared to the prior art, the present invention has the merits of lower reaction temperature, absence of back mixing of the reactant, shorter residence time, and less by-products.

2. The energy consumption is lower: compared to the prior art, the energy consumption is lower because the reaction temperature, feed molar ratio, and the amount of the ethylene glycol subjected to circular recovery treatment are lowered.

3. The production cost is lower: compared to the prior art, the comprehensive production cost is evidently lowered because of the lower unit consumption, lower energy consumption, and lower investment.

The invention claimed is:

1. A reaction or separation device, wherein materials circularly flow in a container and a pipe, the device being used in a case of the presence of escaping vapor due to evaporation or reaction comprising a container and an externally circulating pipe, wherein the container is a double-chamber structure; an inner chamber is installed inside the container and the continuous space of the container outside the inner chamber forms the outer chamber; the top of the inner chamber locates in the continuous space of the container from the top downwards; the inner chamber consists of an outer cylinder and an inner cylinder with the latter being jacketed with the former, and there exists a space between the walls of the outer cylinder and the inner cylinder; wherein the lower end of the outer cylinder is open and a connecting passage with a throttling controller is equipped between its upper end and the upper part of the external chamber to regulate the pressure difference between the inner and outer chambers;

the outer cylinder is fixed to the wall or bottom of the container and its lower end is higher than the bottom of the container; the upper end of the inner cylinder is open and its lower end connects with the external circular pipe through the feed outlet;

the inner cylinder is fixed to the bottom of the container and its upper end is higher than the lower end of the outer cylinder and lower than the top cover of the outer cylinder;

a continuous passage is sequentially formed from the spaces between the wall of the outer cylinder and that of the container, between the lower end of the outer cylinder and the bottom of the container, between the wall of the outer cylinder and that of the inner cylinder, and in the inner cylinder;

wherein the external circular pipe connects with the bottom of the container and leads to the inner chamber, and connects with the side wall of the lower part of the container and leads to the outer chamber, respectively.

2. The reaction or separation device according to claim 1, wherein the top of the inner chamber locates below ½ of the height of the container interior.

3. The reaction or separation device according to claim 2, wherein the top of the inner chamber locates at ⅕-½ of the height of the container interior.

4. The reaction or separation device according to claim 1, wherein a continuous ring-shape passage with a section of upright and reverse U-shape is sequentially formed from the spaces between the wall of the outer cylinder and that of the container, between the lower end of the outer cylinder and the bottom of the container, between the wall of the outer cylinder and that of the inner cylinder, and in the inner cylinder.

5. The reaction or separation device according to claim 4, wherein a heat exchanger is installed in the external circular pipe.

6. The reaction or separation device according to claim 4, wherein the sections of the container, outer cylinder, and inner cylinder are all circular.

7. The reaction or separation device according to claim 6, wherein the ratio of the diameter of the inner cylinder to that of the container is 1:1.8-2.5.

8. The reaction or separation device according to claim 1, wherein said container is selected from the following containers: packed tower, plate tower, or reaction kettle.

9. The reaction or separation device according to claim 4, wherein said container is selected from the following containers: packed tower, plate tower, or reaction kettle.

10. A continuous esterification process, which comprises feeding the liquid reaction materials to the reaction or separation device in claim 1, carrying out reaction under the esterification conditions, wherein a liquid seal forms in the continuous passage while the liquid reaction materials circularly flow in the device to isolate the vapor spaces of the inner chamber from the outer chamber; by regulating the volume of the space of the inner chamber, enough pressure difference is generated between the inner chamber and the outer chamber and thereby a driving force for the circular flow of the materials is formed.

11. The process according to claim 10, wherein said liquid reaction materials are phthalic acid and diol.

12. The process according to claim 11, wherein said phthalic acid is selected from p-phthalic acid, m-phthalic acid, and o-phthalic acid.

13. The process according to claim 11, wherein said diol is selected from ethylene glycol, propylene glycol, and butylenes glycol.

14. The process according to claim 11, wherein the molar ratio of fed diol to phthalic acid is 1.5-1.9:1.

15. The process according to claim 10, wherein the reaction temperature is 2580-2900 C and the reaction pressure is 40-120 kPa.

16. A reaction separation device which is used in case of the presence of escaping vapor due to evaporation or reaction comprising:
a container having a bottom;
an outer cylinder located inside and fixed to the container, the outer cylinder having an open lower end elevated from the bottom of the container;
a inner cylinder located inside and fixed to the bottom of the container and jacketed with the outer cylinder, the inner cylinder having an open upper end positioned higher than the lower end of the outer cylinder and lower than the top cover of the outer cylinder;
wherein the container and the outer and inner cylinders define an outer chamber between the container and the outer cylinder and an inner chamber between the outer and inner cylinders;
a connecting passage with a throttling controller being equipped between an upper part of the inner chamber and an upper part of the outer chamber to regulate the pressure difference between the inner and outer chambers; and
an external circular pipe connecting with the bottom of the container to communicate with the inner chamber and connecting with a side wall of a lower part of the container to communicate with the outer chamber;
whereby a continuous passage is sequentially formed between walls of the outer cylinder and the container, between the lower end of the outer cylinder and the bottom of the container, between walls of the outer and inner cylinders, and in the inner cylinder.

* * * * *